US007938032B2

(12) United States Patent
Fernando (10) Patent No.: US 7,938,032 B2
(45) Date of Patent: May 10, 2011

(54) DISSOLUTION TESTING WITH IN-SITU GRAVIMETRIC VOLUME MEASUREMENT

(75) Inventor: C. J. Anthony Fernando, Chapel Hill, NC (US)

(73) Assignee: Agilent Technologies, Inc., Santa Clara, CA (US)

( * ) Notice: Subject to any disclaimer, the term of this patent is extended or adjusted under 35 U.S.C. 154(b) by 222 days.

(21) Appl. No.: 12/262,033

(22) Filed: Oct. 30, 2008

(65) Prior Publication Data
US 2010/0107752 A1    May 6, 2010

(51) Int. Cl.
*G01N 13/00* (2006.01)
*G01N 33/15* (2006.01)

(52) U.S. Cl. ......... 73/865.6; 73/866; 366/241; 366/242; 366/244; 366/249

(58) Field of Classification Search .............. 73/432.1, 73/864.91, 865.6, 866; 366/140, 241–261; 422/224
See application file for complete search history.

(56) References Cited

U.S. PATENT DOCUMENTS

| | | | | |
|---|---|---|---|---|
| 3,791,221 A | * | 2/1974 | Kirschner et al. | 73/866 |
| 3,802,272 A | * | 4/1974 | Bischoff et al. | 73/866 |
| 4,593,563 A | * | 6/1986 | Laine et al. | 73/865.8 |
| 4,725,149 A | * | 2/1988 | Kawakami et al. | 366/141 |
| 4,854,164 A | | 8/1989 | Rhoads | |
| 5,046,569 A | * | 9/1991 | von der Haar et al. | 177/50 |
| 5,076,107 A | * | 12/1991 | Timmermans et al. | 73/866 |
| 5,412,979 A | * | 5/1995 | Fassihi | 73/53.01 |
| 5,589,649 A | * | 12/1996 | Brinker et al. | 73/866 |
| 5,753,868 A | * | 5/1998 | Diem | 177/70 |
| 5,816,701 A | * | 10/1998 | Martin et al. | 366/208 |
| 5,827,984 A | * | 10/1998 | Sinnreich et al. | 73/866 |
| 6,163,149 A | * | 12/2000 | Loffler | 324/232 |
| 6,303,909 B1 | | 10/2001 | Fernando et al. | |
| 6,324,906 B1 | | 12/2001 | Rinkewich et al. | |
| 6,561,025 B2 | * | 5/2003 | Ueno | 73/437 |
| 6,562,301 B1 | | 5/2003 | Dean et al. | |
| 6,673,319 B2 | | 1/2004 | Dean et al. | |
| 6,724,480 B2 | | 4/2004 | de Rigal et al. | |

(Continued)

FOREIGN PATENT DOCUMENTS
GB    1598101 A   *   9/1981
(Continued)

OTHER PUBLICATIONS

International Search Report and Written Opinion From Corresponding PCT Application No. PCT/US2009/062366, Jun. 11, 2010 (11 pgs).

*Primary Examiner* — David A. Rogers (57) ABSTRACT

A dissolution test apparatus includes a vessel support member, weight sensors, a movable component, a media transport cannula, a pump, and an electronic controller. The vessel support member receives vessels. A weight sensor is located at each vessel site. Each weight sensor contacts a vessel and transmits a measurement signal indicative of the weight of the vessel and any contents therein. The movable component moves the media transport cannula toward a vessel site. The pump establishes media flow between the media transport cannula and the selected vessel. The controller communicates with the weight sensors and may also communicate with the pump. Based on the measurement signals received from the weight sensors, the electronic controller may calculate the volume of media in a given vessel. The electronic controller may also control media flows to or from the vessels by transmitting control signals to the pump assembly.

20 Claims, 5 Drawing Sheets

U.S. PATENT DOCUMENTS

| | | |
|---|---|---|
| 6,962,674 B2 | 11/2005 | Dean et al. |
| 7,051,606 B2 * | 5/2006 | Tian et al. .................... 73/866 |
| 7,395,726 B2 * | 7/2008 | Sekizawa et al. ............. 73/866 |
| 2002/0119076 A1 | 8/2002 | Dean et al. |
| 2004/0247489 A1 | 12/2004 | Fernando et al. |
| 2008/0226499 A1 * | 9/2008 | Williams et al. ............. 422/64 |
| 2008/0312557 A1 | 12/2008 | Cho et al. |

FOREIGN PATENT DOCUMENTS

| | | |
|---|---|---|
| JP | 2007312676 A * | 12/2007 |
| WO | 0157480 A1 | 8/2001 |

* cited by examiner

DISSOLUTION TESTING WITH IN-SITU GRAVIMETRIC VOLUME MEASUREMENT

FIELD OF THE INVENTION

The present invention relates generally to dissolution testing of analyte-containing media. More particularly, the invention relates to measuring media volume while such media resides in test vessels of a dissolution test apparatus.

BACKGROUND OF THE INVENTION

Dissolution testing is often performed as part of preparing and evaluating soluble materials, particularly pharmaceutical dosage forms (e.g., tablets, capsules, and the like) consisting of a therapeutically effective amount of active drug carried by an excipient material. Typically, dosage forms are dropped into test vessels that contain dissolution media of a predetermined volume and chemical composition. For instance, the composition may have a pH factor that emulates a gastrointestinal environment. Dissolution testing can be useful, for example, in studying the drug release characteristics of the dosage form or in evaluating the quality control of the process used in forming the dose. To ensure validation of the data generated from dissolution-related procedures, dissolution testing is often carried out according to guidelines approved or specified by certain entities such as United States Pharmacopoeia (USP), in which case the testing must be conducted within various parametric ranges. The parameters may include dissolution media temperature, the amount of allowable evaporation-related loss, and the use, position and speed of agitation devices, dosage-retention devices, and other instruments operating in the test vessel.

As a dosage form is dissolving in the test vessel of a dissolution system, optics-based measurements of samples of the solution may be taken at predetermined time intervals through the operation of analytical equipment such as a spectrophotometer. The analytical equipment may determine analyte (e.g. active drug) concentration and/or other properties. The dissolution profile for the dosage form under evaluation—i.e., the percentage of analytes dissolved in the test media at a certain point in time or over a certain period of time—can be calculated from the measurement of analyte concentration in the sample taken. In one specific method employing a spectrophotometer, sometimes referred to as the sipper method, dissolution media samples are pumped from the test vessel(s) to a sample cell contained within the spectrophotometer, scanned while residing in the sample cell, and in some procedures then returned to the test vessel(s). In another more recently developed method, sometimes referred to as the in situ method, a fiber-optic "dip probe" is inserted directly in a test vessel. The dip probe includes one or more optical fibers that communicate with the spectrophotometer. In the in situ technique, the spectrophotometer thus does not require a sample cell as the dip probe serves a similar function. Measurements are taken directly in the test vessel and thus optical signals rather than liquid samples are transported between the test vessel and the spectrophotometer via optical fibers.

In conjunction with dissolution testing, it is useful to measure the volume of media residing in a given vessel. For example, it may be desirable to control the precise amount of media added to a vessel such as during a media filling, refilling, replenishing, replacement or return procedure, a solvent or reagent addition procedure, etc. Likewise, it may be desirable to control the precise amount of media removed from a vessel such as when transferring a sample aliquot to an analyzing device. Conventionally, volumetric measurements of media are taken outside of the vessel (i.e., ex situ). Ex situ measurements of volume are imprecise because one must account for the volume of liquid left in the media supply line or media aspiration line. An alternative conventional technique is to first tare the empty vessel, add an unknown quantity of media to the vessel, and weigh the vessel and its media contents and then subtract the tare weight of the vessel to obtain the weight of the media contained in the vessel. The volume of the media is then calculated from this weight value and the known specific gravity of the media. This latter technique requires weighing procedures that are performed outside of the dissolution test apparatus and cannot be integrated with the dissolution test procedure. Thus, vessels of the dissolution test apparatus must be taken off-line and removed from the dissolution test apparatus. Moreover, such weight measurements cannot be taken in real-time or on-demand during dissolution testing.

Accordingly, there is a need for methods and apparatus for obtaining volumetric measurements of media directly at the vessels of a dissolution test apparatus.

SUMMARY OF THE INVENTION

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, dissolution test apparatus is provided. The dissolution test apparatus includes a vessel support member, a plurality of weight sensors, a movable component, a media transport cannula, a pump assembly, and an electronic controller. The vessel support member includes a plurality of vessel mounting sites for supporting a plurality of vessels. Each vessel mounting site has an aperture for receiving a vessel. At least one weight sensor is located at each vessel mounting site. Each weight sensor is positioned to contact a vessel received in the respective aperture, and is configured to transmit a measurement signal indicative of the weight of the vessel and any contents therein. The movable component is positioned above the vessel support member. The media transport cannula is supported by the movable component and is movable thereby to at least one selected vessel mounting site. The pump assembly communicates with the media transport cannula and is configured to establish media flow between the media transport cannula and a vessel mounted at the aperture of the selected vessel mounting site. The electronic controller communicates with the weight sensors. The electronic controller is configured to receive the measurement signals from the weight sensors and, based on the received measurement signals, calculate the volume of media in the vessels associated with the received measurement signals.

According to another implementation, a method is provided for making a volumetric measurement of media contained in a vessel of a dissolution test apparatus. A vessel is mounted at the dissolution test apparatus such that the vessel contacts a weight sensor of the dissolution test apparatus. One or more measurement signals are transmitted from the weight sensor to an electronic controller of the dissolution test apparatus. Based on the one or more transmitted measurement signals, the electronic controller is operated to calculate the volume of media contained in the vessel.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
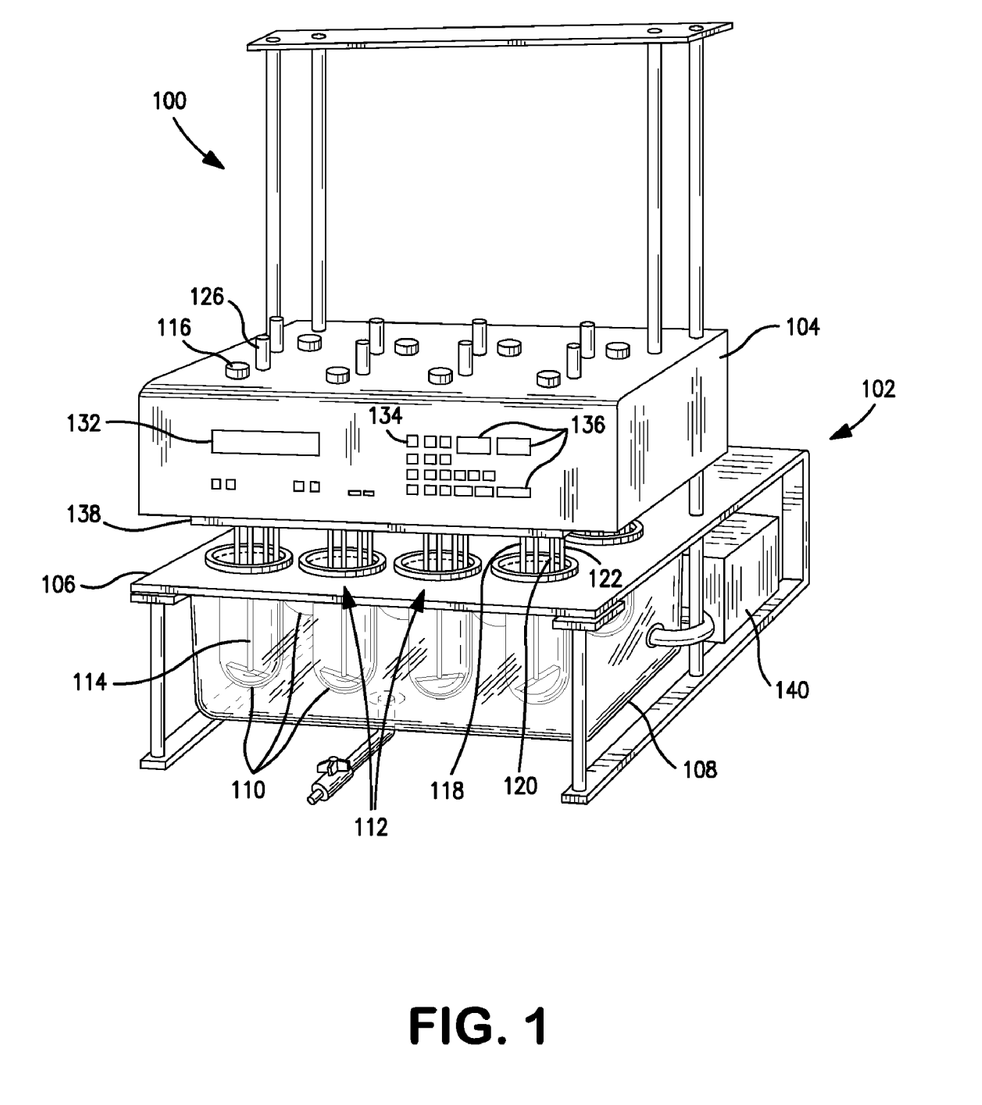
FIG. 1 is a perspective view of an example of a dissolution test apparatus according to an implementation taught in the present disclosure.

FIG. 1 is a perspective view of an example of a dissolution test apparatus 100 according to an implementation of the present disclosure. The dissolution test apparatus 100 may include a frame assembly 102 supporting various components such as a main housing, control unit or head assembly 104, a vessel support member (e.g., a plate, rack, etc.) 106 below the head assembly 104, and a water bath container 108 below the vessel support member 106. The vessel support member 106 supports a plurality of vessels 110 extending into the interior of the water bath container 108. FIG. 1 illustrates eight vessels 110 by example, but it will be understood that more or less vessels 110 may be provided. The vessels 110 may be locked and centered in place on the vessel support member 106 by means such as ring lock devices or clamps (not shown) at a plurality of vessel mounting sites 112. Alternatively, the vessels 110 themselves may be configured to have centering capability, as disclosed for example in U.S. Pat. Nos. 6,562,301 and 6,673,319, assigned to the assignee of the present disclosure. Vessel covers (not shown) may be provided to prevent loss of media from the vessels 110 due to evaporation, volatility, etc. Optionally, the vessel covers may be coupled to the head assembly 104 and movable by motorized means into position over the upper openings of the vessels 110, as disclosed for example in U.S. Pat. No. 6,962,674, assigned to the assignee of the present disclosure. As described further below, the vessel support member 106 includes weight measurement devices (sensors, detectors, etc., not shown) for weighing the vessels 110. The weight measurement devices communicate with circuitry that may be located in the head assembly 104 or elsewhere at the dissolution test apparatus 100. Water or other suitable heat-carrying liquid medium may be heated and circulated through the water bath container 108 by means such as an external heater and pump module 140, which may be included as part of the dissolution test apparatus 100. Alternatively, the dissolution test apparatus 100 may be a waterless heating design in which each vessel 110 is directly heated by some form of heating element disposed in thermal contact with the wall of the vessel 110, as disclosed for example in U.S. Pat. Nos. 6,303,909 and 6,727,480, assigned to the assignee of the present disclosure.

The head assembly 104 may include mechanisms for operating or controlling various components that operate in the vessels 110 (in situ operative components). For example, the head assembly 104 typically supports stirring elements 114 that include respective motor-driven spindles and paddles operating in each vessel 110. Individual clutches 116 may be provided to alternately engage and disengage power to each stirring element 114 by manual, programmed or automated means. The head assembly 104 also includes mechanisms for driving the rotation of the stirring elements 114. The head assembly 104 may also include mechanisms for operating or controlling media transport cannulas that provide liquid flow paths between liquid lines and corresponding vessels 110. In the present context, the term "between" encompasses a liquid flow path directed from a liquid line into a vessel 110 or a liquid flow path directed from a vessel 110 into a liquid line. Accordingly, the media transport cannulas may include media dispensing cannulas 118 for dispensing media into the vessels 110 and media aspirating cannulas 120 for removing media from the vessels 110. The head assembly 104 may also include mechanisms for operating or controlling other types of in situ operative components 122 such as fiber-optic probes for measuring analyte concentration, temperature sensors, pH detectors, dosage form holders (e.g., USP-type apparatus such as baskets, nets, cylinders, etc.), video cameras, etc. A dosage delivery module 126 may be utilized to preload and drop dosage units (e.g., tablets, capsules, or the like) into selected vessels 110 at prescribed times and media temperatures. Additional examples of mechanisms for operating or controlling various in situ operative components are disclosed for example in above-referenced U.S. Pat. No. 6,962,674.

The head assembly 104 may include a programmable systems control module for controlling the operations of various components of the dissolution test apparatus 100 such as those described above. Peripheral elements may be located on the head assembly 104 such as an LCD display 132 for providing menus, status and other information; a keypad 134 for providing user-inputted operation and control of spindle speed, temperature, test start time, test duration and the like; and readouts 136 for displaying information such as RPM, temperature, elapsed run time, vessel weight and/or volume, or the like.

The dissolution test apparatus 100 may further include one or more movable components for lowering operative components 114, 118, 120, 122 into the vessels 110 and raising operative components 114, 118, 120, 122 out from the vessels 110. The head assembly 104 may itself serve as this movable component. That is, the entire head assembly 104 may be actuated into vertical movement toward and away from the vessel support member 106 by manual, automated or semi-automated means. Alternatively or additionally, other movable components 138 such as a driven platform may be provided to support one or more of the operative components 114, 118, 120, 122 and lower and raise the components 114, 118, 120, 122 relative to the vessels 110 at desired times. One type of movable component may be provided to move one type of operative component (e.g., stirring elements 114) while another type of movable component may be provided to move another type of operative component (e.g., media dispensing cannulas 118 and/or media aspirating cannulas 120). Moreover, a given movable component may include means for separately actuating the movement of a given type of operative component 114, 118, 120, 122. For example, each media dispensing cannula 118 or media aspirating cannula 120 may be movable into and out from its corresponding vessel 110 independently from the other stirring elements 118 or 120. Alternatively, the head assembly 104 or the movable component 138 may be configured to move a single media dispensing cannula 118 or media aspirating cannula 120 sequentially from one selected vessel 110 to another selected vessel 110.

The media dispensing cannulas 118 and the media aspirating cannulas 120 communicate with a pump assembly (not shown) via fluid lines (e.g., conduits, tubing, etc.). The pump assembly may be provided in the head assembly 104 or as a separate module supported elsewhere by the frame 102 of the dissolution test apparatus 100, or as a separate module located external to the frame 102. The pump assembly may include separate pumps for each media dispensing line and/or for each media aspirating line. The pumps may be of any suitable design, a few examples being the peristaltic type and the syringe type. The media dispensing cannulas 118 and the media aspirating cannulas 120 may constitute the distal end sections of corresponding fluid lines and may have any suitable configuration for dispensing or aspirating liquid (e.g., tubes, hollow probes, nozzles, etc.). In the present context, the term "cannula" simply designates a small liquid conduit of any form that is insertable into a vessel 110.

In a typical operation, each vessel 110 is filled with a predetermined volume of dissolution media by pumping media to the media dispensing cannulas 118 from a suitable media reservoir or other source (not shown). One of the vessels 110 may be utilized as a blank vessel and another as a standard vessel in accordance with known dissolution testing procedures. Dosage units are dropped either manually or automatically (or otherwise inserted or introduced) into one or more selected media-containing vessels 110, and each stirring element 114 (or other agitation or USP-type device) is rotated within its vessel 110 at a predetermined rate and duration within the test solution as the dosage units dissolve. In other types of tests, a cylindrical basket or cylinder (not shown) loaded with a dosage unit is substituted for each stirring element 114 and rotates or reciprocates within the test solution. For any given vessel 110, the temperature of the media may be maintained at a prescribed temperature (e.g., approximately 37+/−0.5° C.) if certain USP dissolution methods are being conducted. The mixing speed of the stirring element 114 may also be maintained for similar purposes. Media temperature is maintained by immersion of each vessel 110 in the water bath of water bath container 108, or alternatively by direct heating as described previously. The various operative components 114, 118, 120, 122 provided may operate continuously in the vessels 110 during test runs. Alternatively, the operative components 114, 118, 120, 122 may be lowered manually or by an automated assembly 104 or 138 into the corresponding vessels 110, left to remain in the vessels 110 only while specific measurements are being taken or functions performed at allotted times, and at all other times kept outside of the media contained in the vessels 110. In some implementations, submerging the operative components 114, 118, 120, 122 in the vessel media at intervals may reduce adverse effects attributed to the presence of the operative components 114, 118, 120, 122 within the vessels 110.

During a dissolution test, sample aliquots of media may be pumped from the vessels 110 via the media aspiration cannulas 120 and conducted to an analyzing device (not shown) such as for example a spectrophotometer or a chromatographic instrument, to measure analyte concentration from which dissolution rate data may be generated or to measure other properties relevant to the dissolution test. In some procedures, the samples taken from the vessels 110 are then returned to the vessels 110 via the media dispensing cannulas 118 or separate media return conduits. Alternatively, sample concentration may be measured directly in the vessels 110 by providing fiber-optic probes as appreciated by persons skilled in the art. After a dissolution test is completed, the media contained in the vessels 110 may be removed via the media aspiration cannulas 120 or separate media removal conduits.

As noted above, the dissolution test apparatus 100 includes weight sensors for measuring the weight of the vessels 110 and any contents therein (e.g., dissolution media, dosage forms introduced into the media, etc.). The weight measurements obtained from these weight sensors may be utilized to calculate the volume of the contents of a selected vessel 110 according to known means. Volumetric determinations may be made at any given instant of time, and/or on a continuous or frequent basis over a desired period of time, for any purpose useful for dissolution procedures. As examples, volumetric determinations may be made based on a comparison of the weight of a selected vessel 110 before adding contents of a given type (e.g., a quantity of media, or a dosage form) and after adding the contents to determine the weight or volume of the contents added or to accurately verify that a desired amount of contents has in fact been added. This may be useful, for example, for accurately verifying the addition of media dispensed into a selected vessel 110 during a vessel fill operation, or during a media replacement operation after media has been removed for analysis or through evaporation loss. Other examples include verifying the accuracy of a desired quantity of an additive such as a solvent, buffer, pH adjustment compound, etc. Another example includes weighing or verifying the weight of a dosage form introduced into the vessel 110 such as a tablet, capsule, transdermal patch, drug-eluting stent, etc. Alternatively or in addition to verification, the volumetric determinations may be made on a continuous basis to control the means being operated to effect the addition of the given contents (e.g., a pump). In such a case, the weight sensors and an electronic controller (processor, circuitry, etc.) provided with the dissolution test apparatus 100 may be operated to perform real-time monitoring operations. For example, during a media addition operation, the weight of a selected vessel 110 may be monitored and correlated with a change in volume of the media residing in the vessel 110. When it is determined that the volume has increased to the desired level, the electronic controller may cease the operation of the media addition means.

Similarly, volumetric determinations may be made based on a comparison of the weight of a selected vessel 110 before removing contents of a given type (e.g., an aliquot of media transferred to a flow cell, spectrophotometer, chromatographic instrument, or other analytical instrument or detector, or to a fraction collector, a multi-port valve, a waste receptacle, etc.) and after removing the contents to determine the weight or volume of the contents removed or to accurately verify that a desired amount of contents has in fact been removed. These types of volumetric determinations may likewise be made on a continuous basis to control the means being operated to effect the removal of the given contents (e.g., a pump) so as to monitor the removal operation on a real-time basis. For example, during a media removal operation, the weight of a selected vessel 110 may be monitored and correlated with a decrease in volume of the media residing in the vessel 110. When it is determined that the volume has decreased to the desired level, the electronic controller may cease the operation of the media removal means.

In all such operations entailing filling, replacing, aspirating, sampling and the like, it will be noted that the weight/volume measurements are made independently of any factor external to the associated vessel, such as any consideration regarding the liquid conduits utilized to transfer the media (or other type of contents) to or from the vessel 110, the liquid moving means (e.g., a pump), valves, etc.

Generally, the weight sensors may be located at individual vessel mounting sites 112 to generate measurement signals indicative of the respective weights of one or more selected individual vessels 110. In some implementations, a weight sensor operates through contact with an associated vessel 110. The weight sensor may contact any surface of the vessel 110 that is suitable for detecting weight, such as the underside of a flanged portion of the vessel 110, the bottom region of the vessel 110, etc. Examples of these types of weight sensors include, but are not limited to, force sensors (e.g., load cells), pressure sensors, and displacement sensors. An example of a displacement sensor is a spring element contacting a vessel 110 that deflects by an amount proportional to the weight of the vessel 110 (including the weight of the contents contained therein). An optical encoder may be utilized to count a number of hash marks correlating to the amount of displacement.

Figure 2:
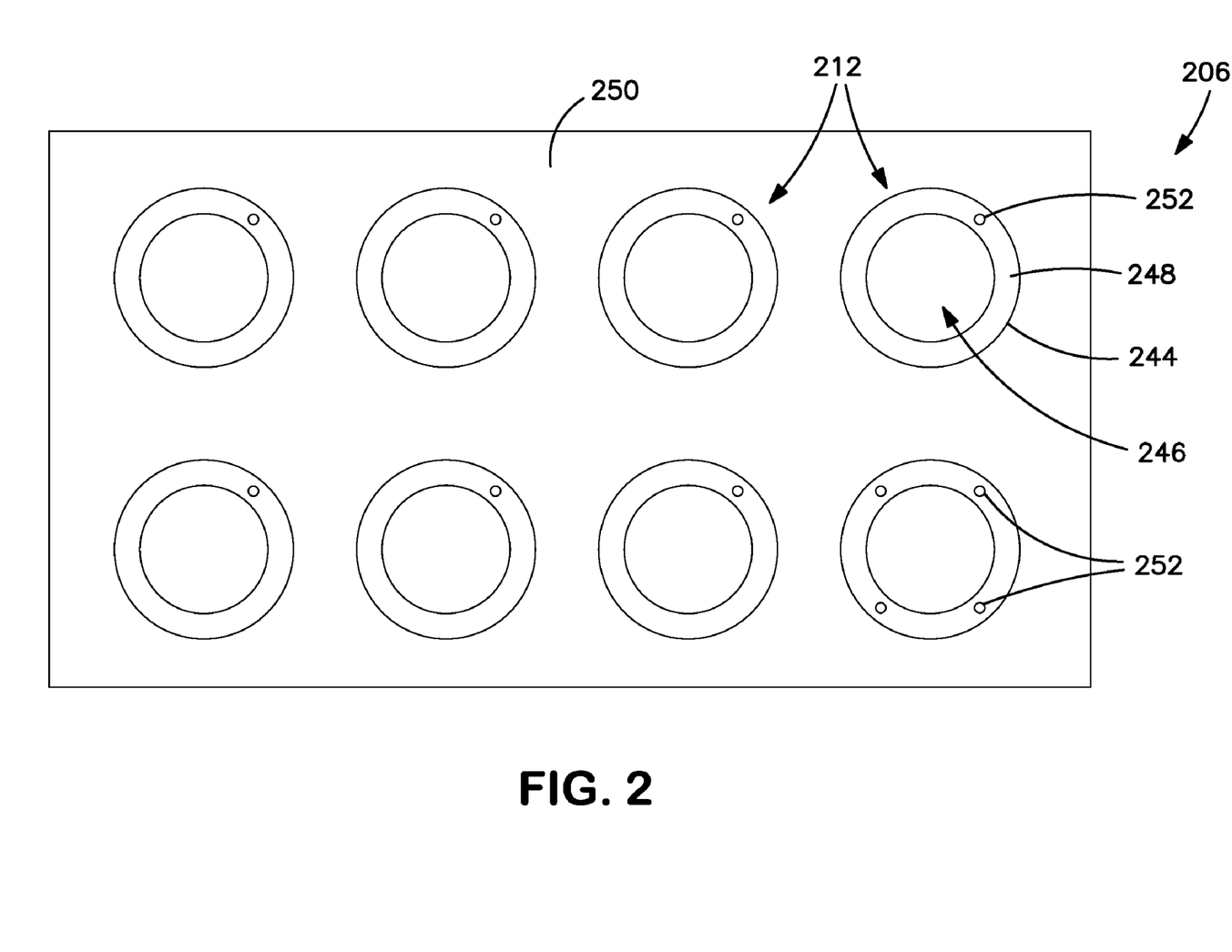
FIG. 2 is a top plan view of an example of a vessel support member that may be included with a dissolution test apparatus such as illustrated in FIG. 1 according to an implementation taught in the present disclosure.

FIG. 2 is a top plan view of an example of a vessel support member 206 that may be included with a dissolution test apparatus such as described above and illustrated in FIG. 1. In this example, the vessel support member 206 is adapted for supporting weight sensors. The vessel support member 206 includes a plurality of vessel mounting sites 212, eight such sites 212 being shown by example. Each vessel mounting site 212 includes a peripheral edge region 244 circumscribing an aperture 246. Each peripheral edge region 244 includes a top surface 248 sized to accommodate the flanged region of a vessel and thereby support the weight of the vessel and any media contained therein. The top surface 248 of each peripheral edge region 244 may be coplanar with, or may be disposed at an elevation above or below, a top surface 250 of the vessel support member 206. The vessel support member 206 further includes a plurality of weight sensors. In this example, the weight sensors are provided in the form of force sensors 252 (e.g., miniature load cells). At least one force sensor 252 is located at each peripheral edge 244 region and is positioned to make contact with the underside of the flanged portion of a vessel. Accordingly, a vessel is loaded into a corresponding vessel mounting site 212 by extending the body of the vessel through the aperture 246 until the flanged portion of the vessel rests on the peripheral edge region 244, at which time the flanged portion also makes contact with the force sensor(s) 252. As also illustrated, each peripheral edge region 244 may include more than one force sensor 252, in which case the force measurements may be averaged to obtain the weight of the given vessel. The additional force sensors 252 may also be desired for maintaining perfect level orientation of the vessels mounted at the vessel mounting sites 212, or alternatively non-sensing adaptor structures may be provided in place of additional force sensors 252 for the same purpose. As noted above, the vessel support member 206 may also include means (not shown) for locking and centering vessels in place at the corresponding vessel mounting sites 212, so long as such means do not impair the operation of the force sensors 252.

Figure 3:
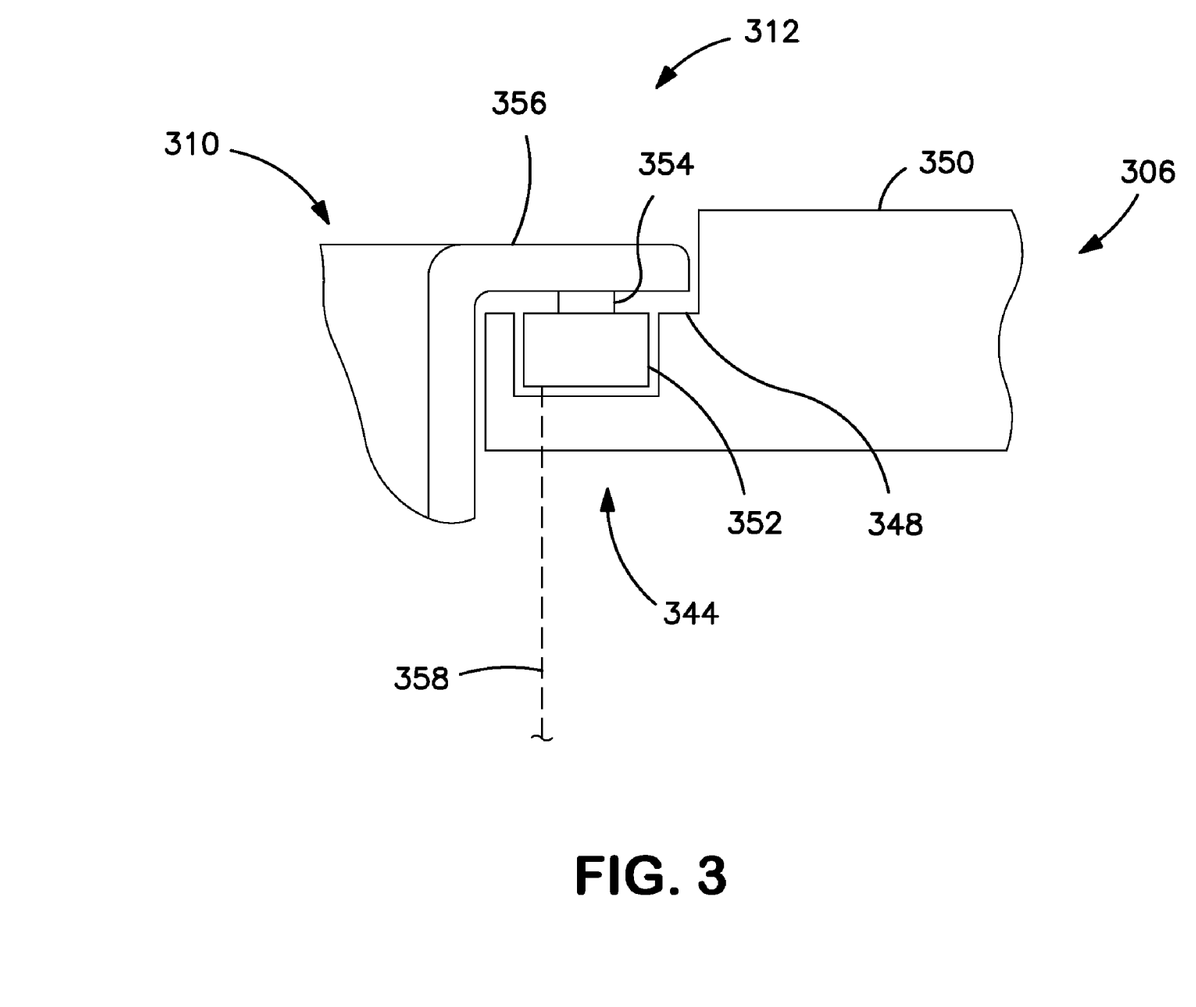
FIG. 3 is a cross-sectional view of a portion of an example of a vessel support member with a vessel mounted at a vessel mounting site of the vessel support member according to an implementation taught in the present disclosure.

FIG. 3 is a cross-sectional view of a portion of an example of a vessel support member 306, with a vessel 310 mounted at a vessel mounting site 312 of the vessel support member 306. A weight sensor such as a force sensor 352 is securely mounted at a peripheral edge region 344 of the vessel support member 306 by any suitable means. The force sensor 352 may include a contact portion 354 positioned to make contact with the underside of a flanged portion (e.g., rim, flange, etc.) 356 of the vessel 310 and generate an electrical signal proportional to the weight of the vessel 310 bearing down on the force sensor 352. It will be noted that the flanged portion 356 may be a separate component that is removably attached to the vessel 310, such as disclosed in above-cited U.S. Pat. Nos. 6,562,301 and 6,673,319. A wire 358 transmits measurement signals from the force sensor 352 to suitable circuitry described elsewhere in the present disclosure. Alternatively, the force sensor 352 may be configured to transmit measurement signals wirelessly. To generate a measurement signal, the contact portion 354 may be translatable or compressible (deflectable). For illustrative purposes, the distance by which the contact portion 354 extends above a top surface 348 of the peripheral edge region 344 is exaggerated in FIG. 3. In practice, only a slight amount of translation or compression of the contact portion 354 may be required to produce an accurate measurement signal, such that the uppermost surface of the contact portion 354 may be substantially flush with the top surface 348 of the peripheral edge region 344. The force sensor 352 may have any design suitable for operation at the vessel mounting site 312. As examples, the force sensor 352 may be a load cell or another type of weight sensor such as noted above (e.g., pressure sensor, spring element with optical encoder, etc.).

Figure 4:
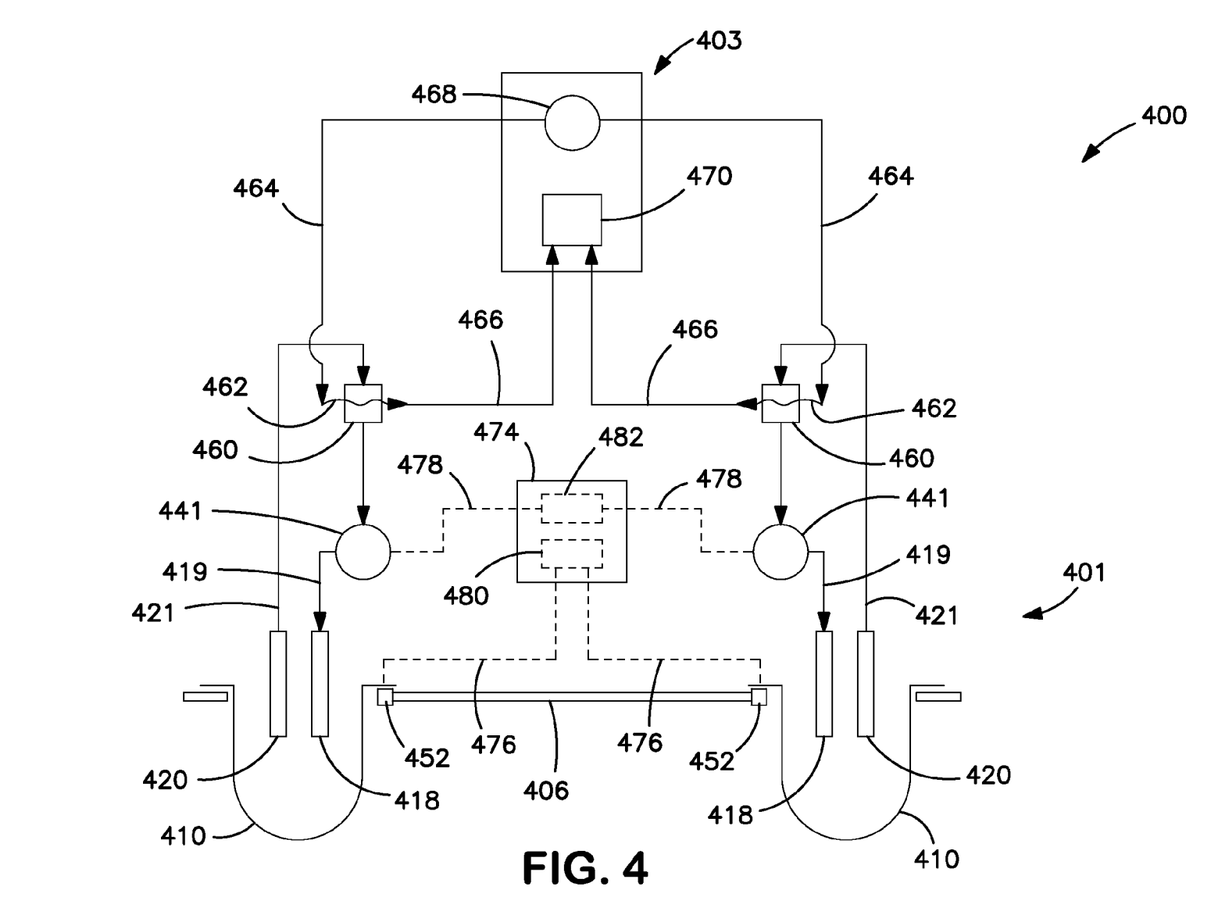
FIG. 4 is a schematic view of an example of an analytical system according to an implementation taught in the present disclosure.

FIG. 4 is a schematic view of an analytical system 400 that generally includes a dissolution test apparatus 401 operating in conjunction with an analytical instrument 403 such as, for example, a spectrophotometer, a chromatography instrument, etc. The dissolution test apparatus 401 includes a plurality of vessels 410 mounted at a vessel support member 406. For simplicity, two vessels 410 are illustrated with the understanding that more than two vessels 410 may be provided as noted previously. One or more media transport cannulas are insertable into each vessel 410. Such media transport cannulas may include media dispensing cannulas 418 and media aspirating cannulas 420. Each media dispensing cannula 418 communicates with a suitable media dispensing line 419 and each media aspirating cannula 420 communicates with a suitable media aspirating line 421. In the context of the present disclosure, such fluid lines 419 and 421 may represent one or more conduits, tubing, valves, manifolds, and other types of components utilized for liquid transport as appreciated by persons skilled in the art. In the present example, each pair of media dispensing and media aspirating cannulas 418 and 420 associated with a given vessel 410 communicates with a corresponding flow cell 460. The flow of media through each flow cell 460 is irradiated with a light beam 462 to generate analytical signals from which analyte concentration, and thus dissolution data, may be derived. The light beams 462 that propagate through the flow cells 460 may be routed through suitable optical components (e.g., optical fibers 464 and 466, lenses, etc.). The flow cells 460 are typically integrated with the analytical instrument 403, but alternatively may be integrated with the dissolution test apparatus 401 or located at some other location remote from the analytical instrument 403.

In the example illustrated in FIG. 4, the dissolution test apparatus 401 is configured to establish closed-loop liquid circuits associated with each vessel 410. For this purpose, the dissolution test apparatus 401 includes a pump assembly that includes at least one pump 441 communicating with a corresponding media dispensing cannula 418 or media aspirating cannula 420. In other implementations, one pump 441 communicates with a media dispensing cannula 418 and another pump (not shown) communicates with a corresponding media aspirating cannula 420. Accordingly, in the present example, each closed-loop liquid circuit is defined by a vessel 410, a media aspirating cannula 420 and associated media aspirating line 421, a flow cell 460, a media dispensing cannula 418 and associated media dispensing line 419, and one or more pumps 441. As an alternative or in addition to communicating with the flow cells 460, the media dispensing cannulas 418 may communicate with one or more sources (not shown) of dissolution media, solvents, reagents liquids for rinsing or washing, and the like. Likewise, the media aspirating cannulas 420 may communicate with one or more liquid receptacles (not shown) such as waste receptacles, recovery tanks or reservoirs, etc. Additional fluid lines and pumps (not shown) may be provided for transporting liquid from sources to the vessels 410 and from vessels 410 to receptacles. As noted previously, an alternative to providing flow cells 460 ex situ is to provide dip probes (not shown) containing similar flow cells insertable directly into each vessel 410 along with fiber-optics for routing light signals to and from the analytical instrument 403.

The analytical instrument 403 may include one or more light sources 468 for transmitting light beams 462 of an initial intensity to the flow cells 460 to irradiate the liquid media flowing therethrough, and one or more optical detectors 470 for receiving light beams 462 from the flow cells 460 to determine the amount of attenuation of the light beam 462 resulting from passage through the media in the flow cell 460. Examples of suitable light sources 468 include, but are limited to, one or more lamps (e.g., deuterium, xenon, etc.), LEDs, lasers or laser diodes (LDs), etc. Examples of suitable optical detectors 470 include, but are limited to, one or more photocells, photodiodes, etc. As appreciated by persons skilled in the art, the analytical instrument 403 may include appropriate means for routing optical signals between the flow cells 460 and the light source(s) 468 and the optical detector(s) 470 (e.g., optical switches, multiplexers, demultiplexers, optical fibers 464 and 466, light pipes, gratings, mirrors, etc.), as well as electronic processor-based control components, user interfaces, etc. In other types of analytical instruments 403 such as those implementing chromatographic or other analytical separation or detection techniques, the specific features of the analytical instrument 403 will differ from those described above as appreciated by persons skilled in the art.

The dissolution test apparatus 401 further includes an electronic controller 474 communicating with suitable weight measurement devices such as force sensors 452 via suitable electrical lines 476. In some implementations, the electronic controller 474 may also communicate with the media pumps 441 via suitable electrical lines 478. In some implementations, the electronic controller 474 may control the operation of the media pumps 441 based on measurement signals received from the force sensors 452. As appreciated by persons skilled in the art, the electronic controller 474 may be processor-based and include analog and/or digital attributes as well as hardware, firmware and/or software attributes. In the present schematic context, the electrical lines 476 and 478 represent wires or other physical types of electrical conduits or, alternatively, wireless transmissions of electromagnetic signals.

The electronic controller 474 includes media volume calculation circuitry 480. The media volume calculation circuitry 480 is configured to receive measurement signals (e.g., signals indicative of weight, force, deflection, etc.) transmitted from the force sensors 452 over electrical lines 476 and calculate the volume of media residing in each vessel 410 from which a measurement signal was received. Volumetric calculations may occur according to any temporal basis or event-responsive basis, and such basis may be pre-programmed into the electronic controller 474 or selected by the user. As examples, volumetric calculations may occur on an essentially continuous or real-time basis or intermittently according to programmed or user-desired intervals. Volumetric calculations may also be driven by events occurring or operations performed in one or more vessels 410, such as in response to the initiation or completion of a media dispensing step (e.g., filling, adding, replacing, etc.), the initiation or completion of a media aspirating step (e.g., sampling, removing, etc.), or the initiation or completion of a full or partial dissolution testing procedure. Volumetric calculations may also be performed to monitor media volume during an event such as media dispensing, media aspirating, and/or dissolution of a dosage form.

The media volume calculation circuitry 480 may be configured to utilize a measurement signal to calculate media volume according to any suitable technique. In one example, the media volume calculation circuitry 480 utilizes a measurement signal in combination with the known density or specific gravity of the media to calculate the volume of media in a vessel 410 of interest. The media volume calculation 480 circuitry is also configured to account for the tare weight of the vessel 410 itself. The media volume calculation circuitry 480 may also configured to account for the weight or volumetric displacement attributable to a stirring or other agitation device, or other type of in situ device, operating in the vessel 410. The media volume calculation circuitry 480 may also configured to weigh, or verify the expected weight of, a dosage form introduced into a vessel 410 such as by comparing the weight of the vessel 410 before and after introduction of the dosage form (taking into account the weight or volumetric displacement attributable to any device utilized to hold or contain the dosage form in the vessel 410). The media volume calculation circuitry 480 may also be configured to calculate the amount of media lost through evaporation over a period of time, such as by comparing measurement signals taken at the start and end of such period of time. Optionally, the media volume calculation circuitry 480 may be configured to display weight values of the vessels 410, with or without media, or the volume of media in the vessels 410, or the weights of dosage forms introduced into the vessels 410, via a suitable display or readout device such as may be provided with the dissolution test apparatus 401.

The electronic controller 474 may further include pump control circuitry 482 configured to transmit pump control signals to the pumps 441 over electrical lines 478. The control signals may be configured to control the ON/OFF operation of the pumps 441, or in addition to control the flow rate of media through the media dispensing cannulas 418 and/or media aspirating cannulas 420 via the pumps 441. The pump control circuitry 482 may communicate with the volume calculation circuitry 480 such that pump control circuitry 482 transmits pump control signals in response to volumetric calculations and decisions made by the volume calculation circuitry 480.

For example, in a media dispensing operation, the volume calculation circuitry 480 may be configured to monitor the volume of media while the media is being pumped into a vessel 410. When the volume calculation circuitry 480 determines that the volume of media in the vessel 410 has reached a preset value, the volume calculation circuitry 480 communicates that event to the pump control circuitry 482. In response, the pump control circuitry 482 transmits a control signal to the pump 441 to shut off flow to that vessel 410. The media dispensing operation may serve any number of functions in the context of dissolution testing, such as filling a vessel 410 with a desired amount of dissolution media in preparation for the introduction of a dosage form to be dissolved in the media, filling the vessel 410 with a desired amount of an acid to obtain a desired acid concentration in the vessel 410, filling the vessel 410 with a desired amount of a buffer to adjust the pH level in the dissolution media, replenishing the vessel 410 with additional dissolution media after or during removal of a sample portion of media for analysis, etc.

For another example, in a media aspirating operation, the volume calculation circuitry 480 may be configured to monitor the volume of media while the media is being pumped from the vessel 410. When the volume calculation circuitry 480 determines that the volume of media in the vessel 410 has reached a preset value, the volume calculation circuitry 480 communicates that event to the pump control circuitry 482. In response, the pump control circuitry 482 transmits a control signal to the pump 441 to shut off flow from that vessel 410. The media aspirating operation may serve any number of functions in the context of dissolution testing, such as emptying a vessel 410 of its liquid contents after a dissolution testing or vessel rinsing procedure, taking a sample of media of a desired volume from the vessel 410 for transport to a flow cell 460 or some type of analytical instrument, etc.

It will be understood that aspirated media may be transported to an analytical instrument 403 other than an optical cell-based instrument such as the spectrophotometer described by example above. Other examples of analytical instruments 403 include, but are not limited to, liquid or gas chromatographs, mass spectrometers, nuclear magnetic resonance spectrometers, fraction collectors, etc. As also noted elsewhere in the present disclosure, a given media dispensing line 419 to which flow control by the in situ volumetric-based techniques taught herein is applied need not be a media return line from a flow cell 460 or other component of an analytical instrument 403. Alternatively, the media dispensing line 419 may be a media fill line or media replacement line utilized to transport fresh media from a supply source.

As an alternative or in addition to continuous monitoring of pumping operations, the volume calculation circuitry 480 may utilize measurement signals received from the force sensors 452 to verify that a desired amount of media or other liquid has in fact been dispensed into or removed from one or more vessels 410. For example, the volume calculation circuitry 480 may acquire a measurement signal before a pump 441 is activated to supply liquid to a vessel 410 or withdraw liquid from a vessel 410, and subsequently acquire a second measurement signal after the operation of the pump 441 has ceased. The volume calculation circuitry 480 may then compare the two measurement signals to accurately determine the volume of liquid added or removed.

The dissolution test apparatus 401 may include a plurality of media dispensing cannulas 418 and/or media aspirating cannulas 420 associated with the respective vessels 410, as described above. In this case, media or other liquid may be dispensed and/or aspirated into all vessels 410 or a selected group of vessels 410 simultaneously. Alternatively, the dissolution test apparatus 401 may include a single media dispensing cannula 418 and/or media aspirating cannula 420 that moves sequentially from one selected vessel 410 to another for sequential dispensing and/or aspirating operations. It will be appreciated that the in situ volumetric techniques taught in the present disclosure are applicable to all such configurations.

Figure 5:
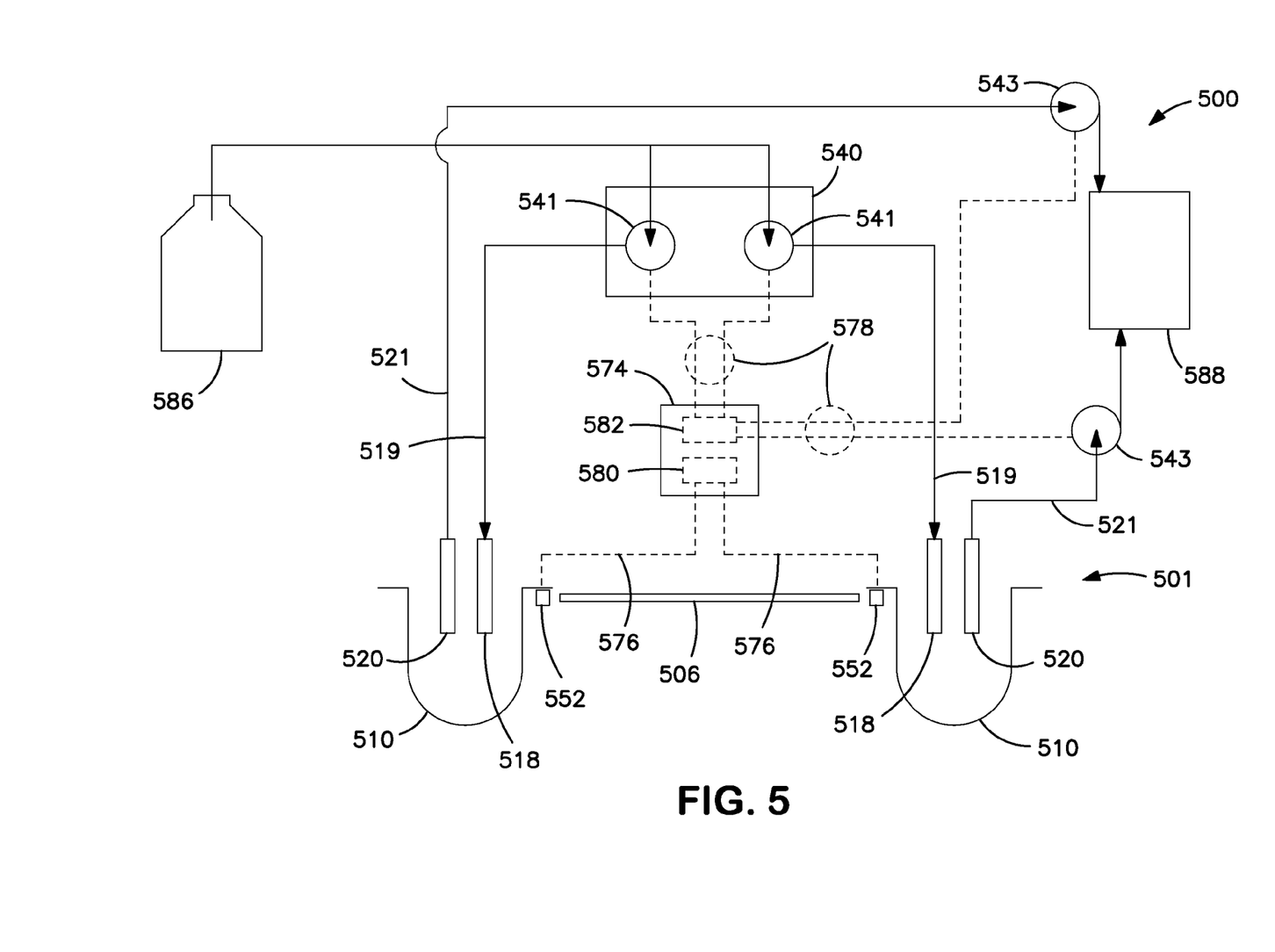
FIG. 5 is a schematic view of another example of an analytical system according to an implementation taught in the present disclosure.

FIG. 5 is a schematic view of another analytical system 500 that generally includes a dissolution test apparatus 501. As in the case of the implementation illustrated in FIG. 4, the dissolution test apparatus 501 may operate in conjunction with an analytical instrument and associated components. In FIG. 5, media dispensing cannulas 518 and associated media dispensing lines 519 of the dissolution test apparatus 501 communicate with a pump assembly 540 that controls media flow from any suitable media supply reservoir 586. The supply reservoir 586 may be utilized to provide any types of components utilized in dissolution media such as, for example, deionized water, solvents, diluents, buffers, acids, chemical reagents, etc. The techniques based on in situ volumetric measurement and flow control as described herein may be applied to these types of media dispensing operations. FIG. 5 also illustrates media aspirating cannulas 520 and associated media aspirating lines 521 of the dissolution test apparatus 501 communicating with pumps 543 that control the flow of media from vessels 510 to a receiving location 588. The receiving location 588 depicted in FIG. 5 may designate an analytical instrument, a waste receptacle, etc. The techniques based on in situ volumetric measurement and flow control as described herein may also be applied to these types of media aspirating operations. The analytical system 500 illustrated in FIG. 5 may otherwise be similar to the analytical system 400 illustrated in FIG. 4, and accordingly like reference numerals designate like components or features.

Other implementations of analytical systems and dissolution test apparatus may include combinations of components or features described above and illustrated in FIGS. 4 and 5. In a given vessel, separate media dispensing cannulas may be provided for dispensing fresh media from a supply reservoir and for returning media from a flow cell or analytical instrument (if media-return capability is provided). Alternatively, the same media dispensing cannula may be provided for all such purposes and may be accomplished by appropriately configuring the plumbing employing for media dispensing (e.g., valves, manifolds, and the like). Likewise, in a given vessel, separate media aspirating cannulas may be provided for transferring media to analytical instruments and for disposing of media after the completion of a dissolution test, or alternatively the same media aspirating cannula may be provided for all such purposes.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be further understood that various aspects or details of the invention may be changed without departing from the scope of the invention. Furthermore, the foregoing description is for the purpose of illustration only, and not for the purpose of limitation—the invention being defined by the claims.

What is claimed is:

1. A dissolution test apparatus, comprising:
    a vessel support member including a plurality of vessel mounting sites for supporting a plurality of vessels, each vessel mounting site having an aperture for receiving a vessel;
    a plurality of weight sensors, at least one weight sensor located at each vessel mounting site, each weight sensor positioned to contact a vessel received in the respective aperture and configured to transmit a measurement signal indicative of the weight of the vessel and any contents therein;
    a movable component positioned above the vessel support member;
    a media transport cannula supported by the movable component and movable thereby to at least one selected vessel mounting site;
    a pump assembly communicating with the media transport cannula and configured to establish media flow between the media transport cannula and a vessel mounted at the aperture of the selected vessel mounting site; and
    an electronic controller communicating with the plurality of weight sensors, the electronic controller configured to receive the measurement signals from the weight sensors and, based on the received measurement signals, calculate volumes of media in the vessels associated with the received measurement signals.

2. The dissolution test apparatus of claim 1, wherein each vessel mounting site includes a peripheral edge region circumscribing the aperture of the vessel mounting site, and at least one weight sensor is located at each peripheral edge region and is positioned to contact an underside of a flange of the vessel received in the aperture.

3. The dissolution test apparatus of claim 1, wherein the electronic controller further communicates with the pump assembly and is configured to control media flow to or from the vessel mounted at the selected vessel mounting site by transmitting one or more control signals to the pump assembly, based on one or more measurement signals received from the weight sensor associated with the selected vessel mounting site.

4. The dissolution test apparatus of claim 1, wherein the electronic controller is configured to calculate a weight of a dosage form contained in the vessel mounted at the selected vessel mounting site based on one or more measurement signals received from the weight sensor associated with the selected vessel mounting site.

5. The dissolution test apparatus of claim 1, wherein the electronic controller is configured to calculate an amount of evaporative loss of media from the vessel mounted at the selected vessel mounting site based on one or more measurement signals received from the weight sensor associated with the selected vessel mounting site.

6. The dissolution test apparatus of claim 1, wherein the pump assembly is configured to establish media flow between the media transport cannula and respective vessels mounted at the apertures of the selected vessel mounting sites.

7. The dissolution test apparatus of claim 6, wherein the electronic controller further communicates with the pump assembly and is configured to control media flow to or from the respective vessels by transmitting one or more control signals to the pump assembly, based on one or more measurement signals received from the weight sensors associated with the selected vessel mounting sites.

8. The dissolution test apparatus of claim 1, wherein:
    the media transport cannula is one of a plurality of media transport cannulas, each media transport cannula supported by the movable component and movable thereby toward respective apertures of the vessel mounting sites;
    the pump assembly communicates with one or more of the media transport cannulas and is configured to selectively establish media flows between the one or more media transport cannulas and respective vessels; and
    the electronic controller further communicates with the pump assembly and is configured to selectively control one or more of the media flows to or from the vessels by transmitting one or more control signals to the pump assembly, based on the received measurement signals.

9. The dissolution test apparatus of claim 8, wherein the media transport cannulas include media dispensing cannulas, the pump assembly is configured to establish media flows from the media dispensing cannulas into respective vessels, and the electronic controller is configured to selectively control one or more of the media flows into the vessels by transmitting one or more control signals to the pump assembly based on the received measurement signals.

10. The dissolution test apparatus of claim 8, wherein the media transport cannulas include media aspirating cannulas, the pump assembly is configured to establish media flows from respective vessels into the media aspirating cannulas, and the electronic controller is configured to selectively control one or more of the media flows from the vessels by transmitting one or more control signals to the pump assembly based on the received measurement signals.

11. The dissolution test apparatus of claim 8, wherein the media transport cannulas include media dispensing cannulas and media aspirating cannulas, the pump assembly is configured to establish media dispensing flows from the media dispensing cannulas into respective vessels and media aspirating flows from respective vessels into the media aspirating lines, and the electronic controller is configured to selectively control one or more of the media dispensing flows or media aspirating flows by transmitting one or more control signals to the pump assembly based on the received measurement signals.

12. A method for making a volumetric measurement of media contained in a vessel of a dissolution test apparatus, the method comprising:
    mounting the vessel at the dissolution test apparatus such that the vessel contacts a weight sensor of the dissolution test apparatus;
    transmitting one or more measurement signals from the weight sensor to an electronic controller of the dissolution test apparatus;
    based on the one or more transmitted measurement signals, operating the electronic controller to calculate the volume of media contained in the vessel; and
    controlling a flow of media between the vessel and a media transport cannula of the dissolution test apparatus by operating the electronic controller to control a pump communicating with the media transport cannula based on the calculated media volume.

13. The method of claim 12, wherein mounting the vessel includes inserting the vessel through an aperture of a vessel support member of the dissolution test apparatus such that an underside of a flange of the vessel contacts the weight sensor, the weight sensor being located at a peripheral edge region of the vessel support member circumscribing the aperture.

14. The method of claim 12, further including introducing a dosage form into the vessel, dissolving the dosage form in the media contained in the vessel, and acquiring dissolution data from the media.

15. The method of claim 12, further including operating the electronic controller to calculate a weight of a dosage form contained in the vessel based on the one or more transmitted measurement signals.

16. The method of claim 12, further including operating the electronic controller to calculate an amount of evaporative loss of media from the vessel based on the one or more transmitted measurement signals.

17. The method of claim 12, further including establishing the flow of media from the media transport cannula and into the vessel, and operating the electronic controller to control the flow of media into the vessel based on the calculated media volume, wherein:
- transmitting the one or more measurement signals includes transmitting a plurality of measurement signals while flowing the media into the vessel;
- operating the electronic controller to calculate the media volume includes monitoring the media volume based on the measurement signals transmitted while flowing the media into the vessel; and
- controlling the media flow includes determining whether the calculated media volume has reached a predetermined value and, when the calculated media volume has reached the predetermined value, operating the pump to shut off the media flow into the vessel.

18. The method of claim 12, further including adding a quantity of media to the vessel for a period of time between a first instant of time and a second instant of time, wherein transmitting one or more measurement signals includes transmitting a first measurement signal at the first instant of time and a second measurement signal at the second instant of time, and operating the electronic controller includes verifying the quantity of media added based on the first transmitted measurement signal and the second transmitted measurement signal.

19. The method of claim 12, further including establishing the flow of media from the vessel and into the media transport cannula, and operating the electronic controller to control the flow of media from the vessel based on the calculated media volume, wherein:
- transmitting one or more measurement signals includes transmitting a plurality of measurement signals while flowing the media from the vessel;
- operating the electronic controller to calculate the media volume includes monitoring the media volume based on the transmitted measurement signals while flowing the media from the vessel; and
- controlling the media flow includes determining whether the calculated media volume has reached a predetermined value and, when the calculated media volume has reached the predetermined value, operating the pump to shut off the media flow from the vessel.

20. The method of claim 12, further including removing a quantity of media from the vessel for a period of time between a first instant of time and a second instant of time, wherein transmitting one or more measurement signals includes transmitting a first measurement signal at the first instant of time and a second measurement signal at the second instant of time, and operating the electronic controller includes verifying the quantity of media removed based on the first transmitted measurement signal and the second transmitted measurement signal.

* * * * *